United States Patent
Katou

(10) Patent No.: US 7,219,010 B2
(45) Date of Patent: *May 15, 2007

(54) VEHICLE NAVIGATION APPARATUS AND A PROGRAM FOR CONTROLLING VEHICLE NAVIGATION APPARATUS

(75) Inventor: Kiyohide Katou, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 242 days.

This patent is subject to a terminal disclaimer.

(21) Appl. No.: 10/743,009

(22) Filed: Dec. 23, 2003

(65) Prior Publication Data

US 2004/0148095 A1    Jul. 29, 2004

(30) Foreign Application Priority Data

Jan. 24, 2003 (JP) .............................. 2003-016335

(51) Int. Cl.
*G01C 21/00* (2006.01)

(52) U.S. Cl. .................. 701/201; 701/25; 701/206; 701/208; 340/988; 340/990

(58) Field of Classification Search ........ 701/200–202, 701/207–211, 23–25; 340/988–990, 992, 340/995.19, 995.21, 995.22, 995.23; 73/178 R
See application file for complete search history.

(56) References Cited

U.S. PATENT DOCUMENTS

| | | | | |
|---|---|---|---|---|
| 5,486,822 A | * | 1/1996 | Tenmoku et al. | 340/995.22 |
| 5,506,779 A | * | 4/1996 | Kanki | 701/209 |
| 5,899,955 A | * | 5/1999 | Yagyu et al. | 701/209 |
| 5,919,246 A | | 7/1999 | Waizmann et al. | |
| 6,047,235 A | * | 4/2000 | Hiyokawa et al. | 701/201 |
| 6,351,707 B1 | * | 2/2002 | Ichikawa | 701/209 |
| 6,591,188 B1 | * | 7/2003 | Ohler | 701/209 |
| 6,751,548 B2 | * | 6/2004 | Fox et al. | 701/201 |
| 2004/0098194 A1 | * | 5/2004 | Baur et al. | 701/209 |
| 2004/0102899 A1 | * | 5/2004 | Kaji et al. | 701/210 |
| 2004/0148094 A1 | * | 7/2004 | Katou | 701/201 |

FOREIGN PATENT DOCUMENTS

| | | |
|---|---|---|
| DE | 198 39 378 A 1 | 3/2000 |
| EP | 0 697 686 A2 | 2/1996 |
| JP | A 08-16991 | 1/1996 |
| JP | A-09-101162 | 4/1997 |

(Continued)

*Primary Examiner*—Gertrude A. Jeanglaude
(74) *Attorney, Agent, or Firm*—Oliff & Berridge, PLC

(57) ABSTRACT

A navigation apparatus for registers a place of departure a destination, a route traveled, a time of day and/or a day of the week that the route was traveled; determines whether an input place of departure and input destination are respectively substantially the same as a place of departure and destination of a registered route; reads out a particular registered route from registered route information, the particular registered route having substantially the same place of departure and destination as the respective input place of departure and input destination and a registered day of the week that is the same as a day of the week and/or a registered time of day that is nearest to a time of day for which route guidance between the input place of departure and input destination is requested, performs route guidance based on a route returned.

27 Claims, 7 Drawing Sheets

FOREIGN PATENT DOCUMENTS

| | | |
|---|---|---|
| JP | 09-134496 | 5/1997 |
| JP | A 09-292251 | 11/1997 |
| JP | A-11-257985 | 9/1999 |
| JP | A 2001-227965 | 8/2001 |
| JP | A 2002-310696 | 10/2002 |
| JP | A 2002-318126 | 10/2002 |
| WO | WO 02/065428 A3 | 8/2002 |

* cited by examiner

Fig. 4
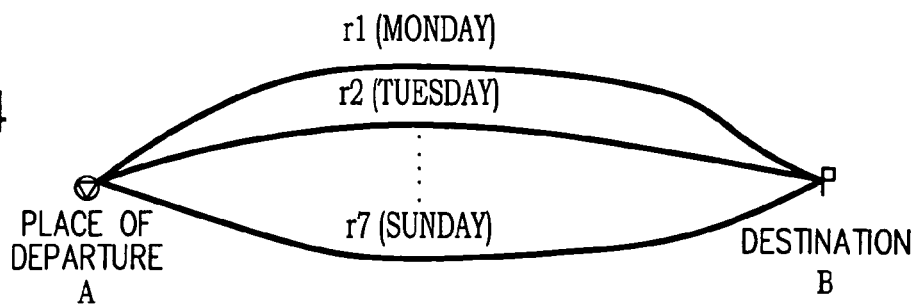
PLACE OF DEPARTURE A — DESTINATION B
r1 (MONDAY)
r2 (TUESDAY)
r7 (SUNDAY)
Fig. 5
PLACE OF DEPARTURE A   DESTINATION B
| DAY OF WEEK | ROUTE |
|---|---|
| MONDAY | r1 |
| TUESDAY | r2 |
| ⋮ | ⋮ |
| SUNDAY | r7 |
Fig. 6
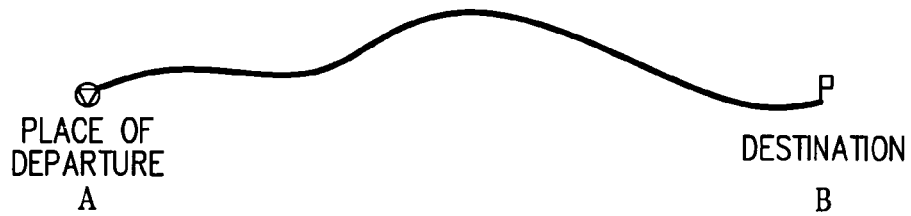
PLACE OF DEPARTURE A    DESTINATION B
Fig. 7
```
PLACE OF DEPARTURE A → DESTINATION B
DRIVING DISTANCE      △△   km
TIME REQUIRED         ××   minutes
UTILIZATION TIME AM   ○○   :00
DAY OF THE WEEK       □    day
REGISTER THIS ROUTE?
   YES        NO
```

Fig. 8
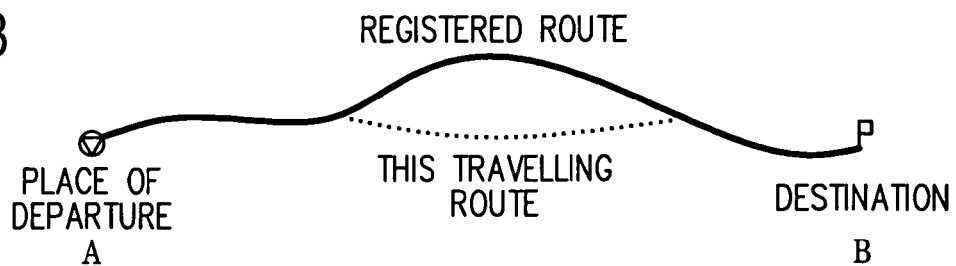
Fig. 9
```
PLACE OF DEPARTURE A → DESTINATION B
DRIVING DISTANCE    △△  km
TIME REQUIRED       ××  minutes
UTILIZATION TIME AM ○○  :00
DAY OF THE WEEK     □   day
UPDATE THIS ROUTE?
       [YES]    [NO]
```
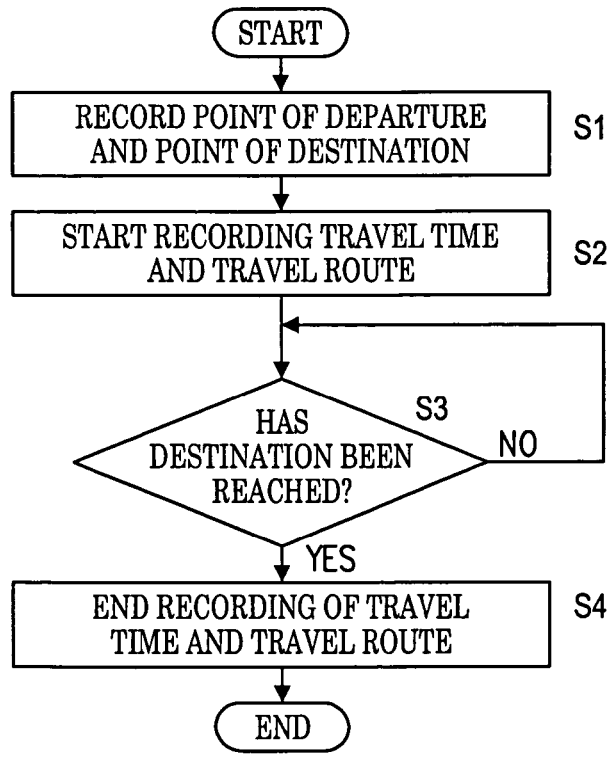
Fig. 10

VEHICLE NAVIGATION APPARATUS AND A PROGRAM FOR CONTROLLING VEHICLE NAVIGATION APPARATUS

INCORPORATED BY REFERENCE

The Disclosure of Japanese Patent Application No. 2003-016335 filed Jan. 24, 2003 including specification, drawings, and claims is incorporated herein by reference in its entirety.

BACKGROUND OF THE INVENTION

1. Field of Invention

The present invention relates to vehicle navigation apparatus and programs which control vehicle navigation apparatus.

2. Description of Related Art

In a conventional navigation apparatus, when a place of departure (or the current position), and a destination are input, search data, such as road data, is read out and a route search is performed based on preset search logic, for example, the shortest traveling distance and/or preference for a particular road type. As the user selects one of the routes which is searched, the user is guided by visual signals and/or audio signals along the selected route until the user reaches the destination.

In some cases, however, a route returned by a search based only on search logic and search data as described above may not fit the user's preferred route. Many conventional navigation apparatus accumulate and store various driving data. Then, based on the stored driving data the navigation apparatus predicts a relating to a user's driving preferences, such as a preferred route and considers the user's preferences during a route search. For example, Japanese Patent Application Laid-Open No. 9-292251 describes a navigation apparatus that stores the number of times a user passes a certain intersection and returns routes that contain intersections that the user prefers. Japanese Patent Application Laid-Open No. 8-16991 describes a navigation apparatus that registers route characteristics such as width of road, a kind of road, traveling speed that the vehicle traveled, determines the user's preferences with respect to those route characteristics, and considers the users preferences when searching for a route.

SUMMARY OF THE INVENTION

However, in the above-described navigation apparatus, because the search considers a user's preferences, such as a user's favorite roads and gives preference to routes that match the user's preference, the navigation apparatus may return an indirect route. As such, the roads which comprise that indirect route match what the navigation apparatus considers the user's preferred type of road. Consequently, in these circumstances the above-described navigation apparatus are incapable of returning a direct route.

Therefore, this invention provides a navigation apparatus for a vehicle including a registration means for registering a place of departure, a destination, a route traveled by the vehicle, and a time of day that the route was traveled; a determination means for determining whether an input place of departure and input destination are respectively substantially the same as a place of departure and destination of a registered route; a route search means for reading out a particular registered route from registered route information, the particular registered route having substantially the same place of departure and destination as the respective input place of departure and input destination and having a registered time of day that is nearest to a time of day for which route guidance between the input place of departure and input destination is requested; and a control means for performing route guidance based on a route returned by the search means.

Further, according to the present invention, there is provided a navigation apparatus for a vehicle including a registration means for registering a place of departure, a destination, a route traveled by the vehicle, and a day of the week that the route was traveled a determination means for determining whether an input place of departure and input destination are respectively substantially the same as a place of departure and destination of a registered route; a route search means for reading out a particular registered route from registered route information, the particular registered route having substantially the same place of departure and destination as the respective input place of departure and input destination and having a registered day of the week that is the same as a f day of the week for which route guidance between the input place of departure and input destination is requested; and a control means for performing route guidance based on a route returned by the search means.

Further, according to the present invention, there is provided a navigation apparatus for a vehicle comprising a registration means for registering a place of departure, a destination, a route traveled by the vehicle, a time of day that the route was traveled, and a day of the week that the route was traveled; a determination means for determining whether an input place of departure and input destination are respectively substantially the same as a place of departure and destination of a registered route; a route search means for reading out a particular registered route from registered route information, the particular registered route having substantially the same place of departure and destination as the respective input place of departure and input destination and having a registered day of the week that is the same as a day of the week for which route guidance between the input place of departure and input destination is requested, and a registered time of day that is nearest to a time of day for which route guidance between the input place of departure and input destination is requested; and a control means for performing route guidance based on a route returned by the search means.

Further, according to the present invention, there is provided a method for providing guidance based on a registered route including inputting a place of departure; inputting a destination; comparing the input place of departure and input destination to respective places of departure and destinations of registered routes; determining if the input place of departure and input destination are substantially the same as respective places of departure and destinations of registered routes of one or more registered routes; reading out a registered route whose registered time of day is nearest to a time of day for which the guidance is requested; and providing guidance.

Further, according to the present invention, there is provided a method for providing guidance based on a registered route including inputting a place of departure; inputting a destination; comparing the input place of departure and input destination to respective places of departure and destinations of registered routes; determining if the input place of departure and input destination are substantially the same as respective places of departure and destinations of registered routes of one or more registered routes; reading out a registered route whose registered day of the week is the same as a day of the week for which the guidance is requested; and providing guidance.

Still, according to the present invention, there is provided a method for providing guidance based on a registered route including inputting a place of departure; inputting a destination; comparing the input place of departure and input destination to respective places of departure and destinations of registered routes; determining if the input place of departure and input destination are substantially the same as respective places of departure and destinations of registered routes of one or more registered routes; reading out a registered route whose registered day of the week is the same as a day of the week for which the guidance is requested and whose registered time of day is nearest to a time of day for which the guidance is requested; and providing guidance based on the read out registered route.

BRIEF DESCRIPTION OF THE DRAWINGS

FIGS. 4 and 5 show diagrams for explaining a registration of a route from the same place of departure to the destination;

FIGS. 6 and 7 show diagrams for explaining registering the first route that the vehicle traveled;

FIGS. 8 and 9 show diagrams for explaining an update of a registration route;

FIG. 10 shows a diagram for explaining a processing flow for registering a traveling route;

DETAILED DESCRIPTION OF EXEMPLARY EMBODIMENTS

Various exemplary embodiments of the systems and methods according to this invention will now be described with reference to the accompanying drawings.

Figure 1:
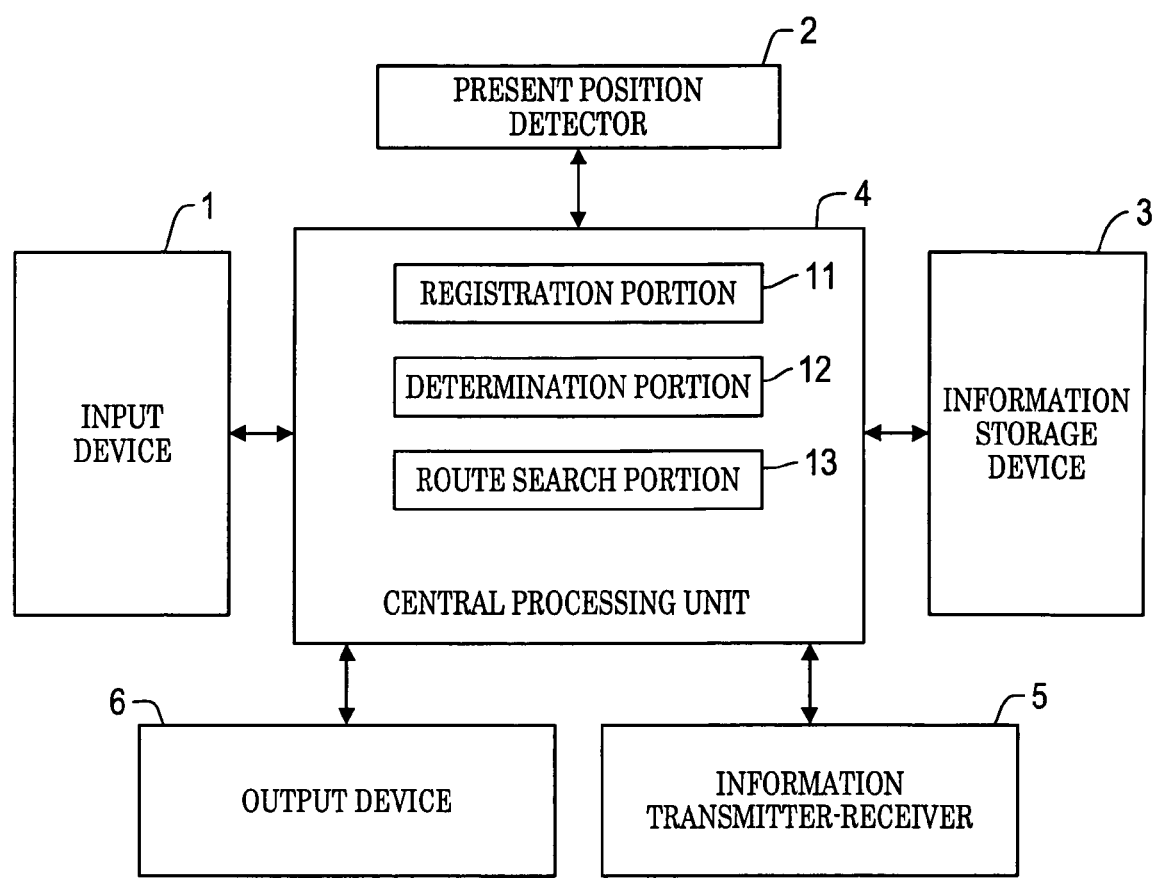
FIG. 1 shows an example of a navigation apparatus for use with various exemplary embodiments of the systems and methods according to this invention.

FIG. 1 shows one example of a navigation apparatus that may be used with this exemplary embodiment of the present invention. It includes an input device 1 for inputting information related to a route guidance, such as a place of departure and a destination; a present position detector 2 for detecting information related to a present position of a vehicle; an information storage device 3 in which map data, navigation data necessary for route search, visual/audio guidance data necessary for a route guidance, and programs (applications and/or operating systems) for performing map display, route search and guidance such as audio guidance are recorded; a central processor 4 for navigation processing, (for example, map display processing, route search processing, and display/audio guidance processing necessary for route guidance,) and for controlling the entire system; an information transmitter-receiver 5 for transmitting and receiving, for example, road information and traffic information, and information related to the present position of the vehicle; and an output device 6 such as a display and/or speaker for outputting information related to route guidance.

The central processor 4 of this embodiment has a portion substantially dedicated to registration 11 having a function of associating and registering the place of departure, the destination and the traveled route with time of day information and/or day of the week information (storing them in a non-volatile memory and the like in an information storage device and a central processor) and a function of updating the traveled route and time of day and/or day of the week information. The central processor 4 further includes a portion substantially dedicated to determination 12 for determining whether or not an input place of departure and an input destination are the same as the place of departure and the destination of a registered route, and a portion substantially dedicated to route search 13 for reading out route information of the nearest registered time of day at the time of use or route information of a registered day of the week corresponding to the day of use from among the previously registered routes, and searching for a route by reducing the search costs for a registered route when it is determined that the input place of departure and input destination are the same as the place of departure and the destination of that registered route.

It should be appreciated that whether the place of departure and the destination of the previously registered route are the same as an input place of departing and destination may be determined by a range. Distance for the determination may be set to, for example 100 m. Then an input place of departure or destination will be considered the same as a respective registered place of departing or destination if the input place of departure or destination is within 100 m of the respective place of departure or destination. Furthermore, the range value may vary in accordance with distance between the place of departure and the destination.

In various other embodiments, a registered route may automatically be provided as a recommended route without performing a search. In this case, a provided route which is impracticable may be changed when, based on traffic regulation data, the navigation device determines that one or more portions of the route are impassible. In this case, the navigation only searches for a route around the one or more impassable portions thereby reducing search time.

Figures 2, 3:
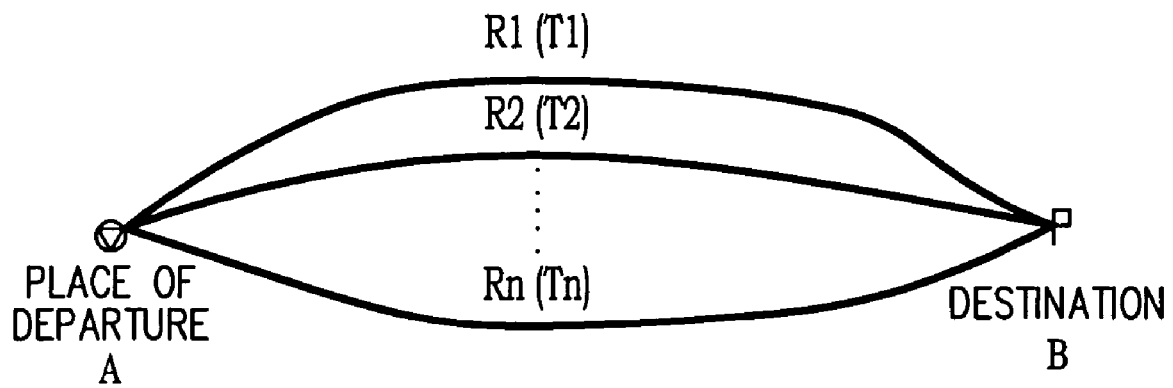
FIGS. 2 and 3 show diagrams for explaining a registration of a route from the same place of departure to the same destination.

FIGS. 2 and 3 show one embodiment of a route search method according to this invention that associates a place of departure, a destination and a route that the vehicle traveled with the time of day that the route was traveled and registers that data for later guidance.

FIG. 2 shows time information and routes that a vehicle traveled from the same place of departure to the same destination. FIG. 3 shows the registration data corresponding to those routes.

When a vehicle travels between the same place of departure A and destination B (as the previously registered route), traffic congestion changes depending on the time of day that the route is traveled. Furthermore, a particular route may have poor visibility in the nighttime. There is a high possibility that a driving situation (i.e. business, private, in the presence of a fellow passenger) varies in every driving situation. As a result, a driver may prefer a different route between point A and point B depending on the time of day. For this reason, this embodiment registers every traveled route between the place of departure A and the destination B (R1 to Rn) and the corresponding time of day the route was traveled by, for example, starting time (T1 to Tn). Because according to this embodiment, time of day T1 to Tn and the route R1 to Rn are related and registered for the same place of departure and destination, when the place of departure and destination for guidance are input, registered route information associated with the registered time of day nearest to the requested travel time (e.g., departure time) is read out and utilized for the route search.

Furthermore, according to this embodiment, once the vehicle has traveled the route and arrived at the destination, if a difference between the registered time of day of the registered route which was provided for guidance and the time of day at which the route was traveled is within a predetermined interval (for example, thirty minutes), a user may be prompted as to whether to update the registered time of day for the registered route to reflect the time of day at which the route was traveled. If the user chooses to update, the time of day for the registered route is updated to reflect the time of day at which the route was traveled.

Furthermore, if the user travels a route that is different from a provided route, a selection request related to whether or not to update the route is displayed. If the user selects to update the route, the previously registered route is updated into the latest route. If the interval between the time of day of the route which is used for the route search and the time of day at the time of use is over the predetermined interval (for example, thirty minutes), a selection request related to whether or not to register the traveled route as a new route is displayed. If the user selects to register the traveled route, the traveled route is registered as a new route.

FIGS. 4 and 5 show an embodiment that associates and registers the place of departure, the destination and the traveled route with day of the week. FIG. 4 shows day of the week information and the route that the vehicle traveled from the same place of departure to the same destination. FIG. 5 shows the corresponding registration data.

When a vehicle travels from the same place of departure A to the same destination B, traffic congestion may differ greatly on the basis of the day of the week. There is a high possibility that a driving situation (i.e.; business, private, or in the presence of a fellow passenger) varies in every driving situation. FIGS. 4 and 5 show, for example, if the traveled route between the place of departure A and the destination B is r1 to r7 for a day of the week Monday to Sunday, the day of the week Monday to Sunday and the route r1 to r7 are related and registered for the same place of departure A and destination B. When the same place of departure A and destination B are input, route information of the day of the week corresponding to the day for which a route search is desired is read out and utilized for that route search. When the vehicle travels a route that is different from the previously registered route for the same day of the week, a selection is provided on the display for the user to indicate whether to register the traveled route as a new route. If the user selects to update the previously registered route into the new route, the new route is registered as a new route.

FIGS. 6 and 7 show exemplary views of registering a first traveled route. FIG. 6 is a diagram for indicating a guidance route from the place of departure to the destination and FIG. 7 is a diagram for indicating a route registration display on arrival at the destination.

For example, when the vehicle travels a route (shown in FIG. 6) that is often used by the user such as a commuter route connecting a place of departure A (home) and a destination B (workplace), the distance between the place of departure A and the destination B and the time required for the travel are recorded. For example, when the vehicle starts traveling, the recording of the traveling time is started, and when the vehicle approaches a point within a predetermined distance from the destination, it is determined that the vehicle has arrived at the destination and the recording of the traveling time is ended. As a method for determining that the vehicle has arrived at the destination, a condition such as reduction in speed of the vehicle near the destination may be added to the above-described predetermined distance. Thus, the determination whether or not the vehicle has arrived at the destination can be determined more accurately. When the vehicle has arrived at the destination, the guidance display shifts to a registration display as shown in FIG. 7. In this display, the place of departure, the destination, the traveling distance, the traveling time, time of day (for example, departure time) and the day of the week are displayed. Furthermore, a message "Register this route?" and selection request "Yes" and "No" are displayed. If "Yes" is selected, the place of departure, the destination and the route that the vehicle traveled are associated with the time of day information and day of the week information and registered by a registration means 11. If "No" is selected, the place of departure, the destination and the route that the vehicle traveled are not registered. When the first route for a particular place of departure and destination is registered, the traveling time and the traveling distance on that route are also registered.

FIGS. 8 and 9 explain an update of a registered route. If the vehicle deviates from the registered route while a guidance is performed on the registered route (indicated by a solid line of FIG. 8) from the place of departure A to the destination B, a new search is performed and the vehicle travels a route indicated by a dotted line of FIG. 8. When the vehicle arrives at the destination, as shown on the guidance display of FIG. 9, a selection request is displayed as to whether to update the traveling distance, the time required, the time of day, the day of the week and a route that the vehicle traveled. If "Yes" is selected, the route is updated. The place of departure, the destination, and the route that the vehicle traveled are associated with the time of day information and the day of the week information and registered by a registration means 11. If "No" is selected, the registered route is hot updated. Thus, the user is provided with criterion for determining whether to update the registered route by the route that is traveled. Therefore, because the route to be updated and registered is based on the user's actual driving preference, a route that meets the user's preference will be provided in the future.

When a vehicle deviates from a registered route, as described above, a new search is performed and a route that leads back to the original route is provided. Because the new search is performed so as to lead the vehicle back to the original route as much as possible, the user can use the registered route more often even if he or she inadvertently deviates from the route. Furthermore, if a road that the vehicle traveled while off of the registered route is a road that is not usually used for a search, for example, an alley, that road cannot be searched for. However, it can be registered as part of a new route. In this case, markings may be displayed on the alley of registered road so that the user can identify the alley. Thus, the registered route can be used even if a road that cannot be searched for is registered.

FIG. 10 is a diagram for explaining a processing flow for recording a traveling route. As shown in FIG. 10, first, input points of departure and destination are recorded, and recording of the time required (i.e. travel time) and recording of the travel route are started (steps S1 and S2). Then it is determined whether or not the vehicle reached the destination (step S3). When the vehicle has reached the destination, recording of the travel time and the recording of the travel route end (step S4). As a result, the travel time and the travel route (including the traveling distance) from the place of departure to the destination are recorded.

Figure 11:
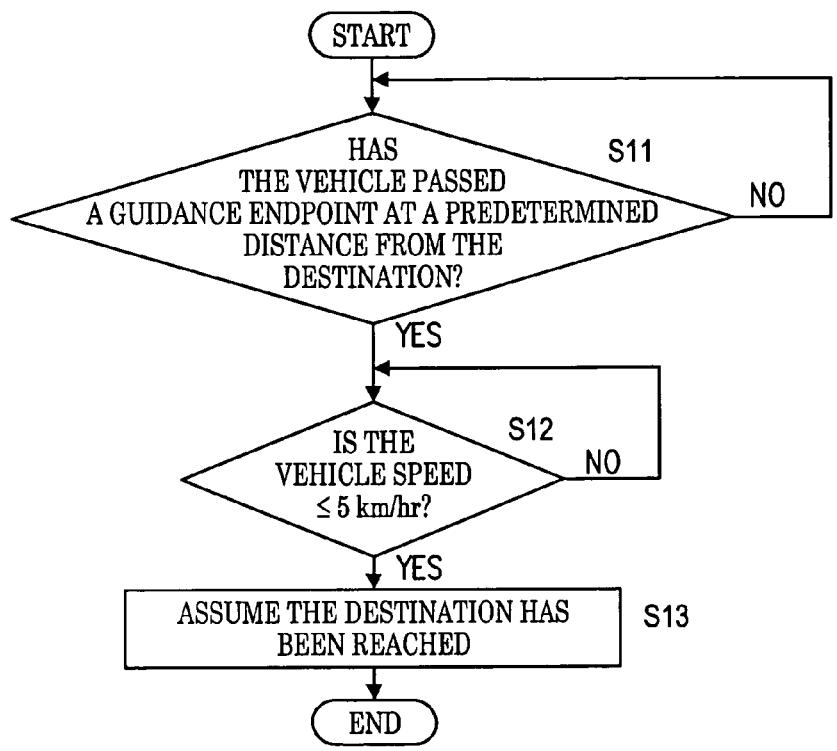
FIG. 11 shows a diagram for indicating a determination processing flow whether or not the vehicle arrived at a destination.

FIG. 11 is a diagram of a processing flow for determining whether or not a vehicle has arrived at the destination. As shown in FIG. 11, first, it is determined whether or not the vehicle has passed a guidance end point that is at a predetermined distance from the destination (step S11). Once the vehicle passes the guidance end point, it is determined whether or not the speed of the vehicle is less than or equal to 5 km/h (step S12). If the speed of the vehicle is less than or equal to 5 km/h, it is assumed that the vehicle has arrived at the destination (step S13).

Figure 12:
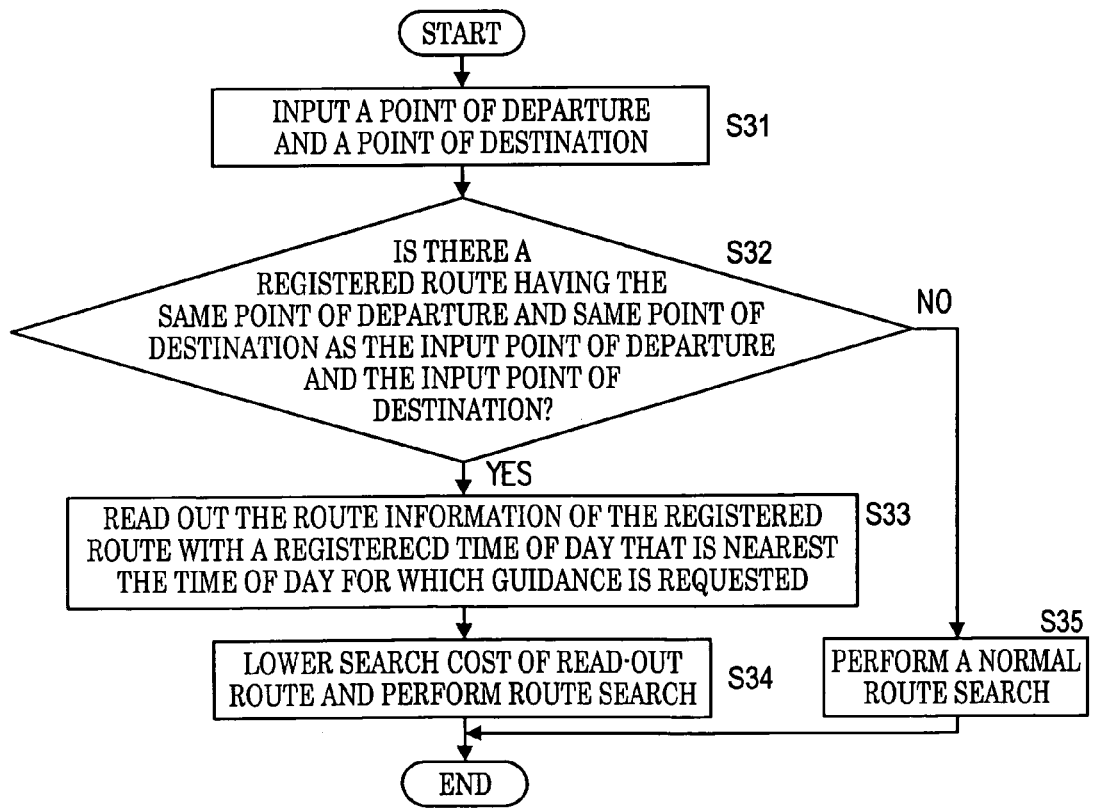
FIG. 12 shows a diagram for explaining a search processing flow of a registration route.

FIG. 12 is a diagram for explaining one embodiment of a search processing flow of the registered route. As shown in FIG. 12, first, a point of departure and a point of destination are input (step S31), it should be appreciated that in various exemplary embodiments of the systems and methods according to this invention that the departure point is considered to be the present location of the vehicle unless the user specifies otherwise. Then, it is determined whether or not there is a registered route having the same point of departure and destination as the input points of departure and destination (step S32). If there is such a registered route, the route information of the registered route with a registered time of day that is nearest the time of day for which guidance is requested is read out (step S33). The search cost of the read-out route is lowered and route search is thus performed (step S34). If there is no registered route at step S32, a normal route search is performed (step S35).

Figure 13:
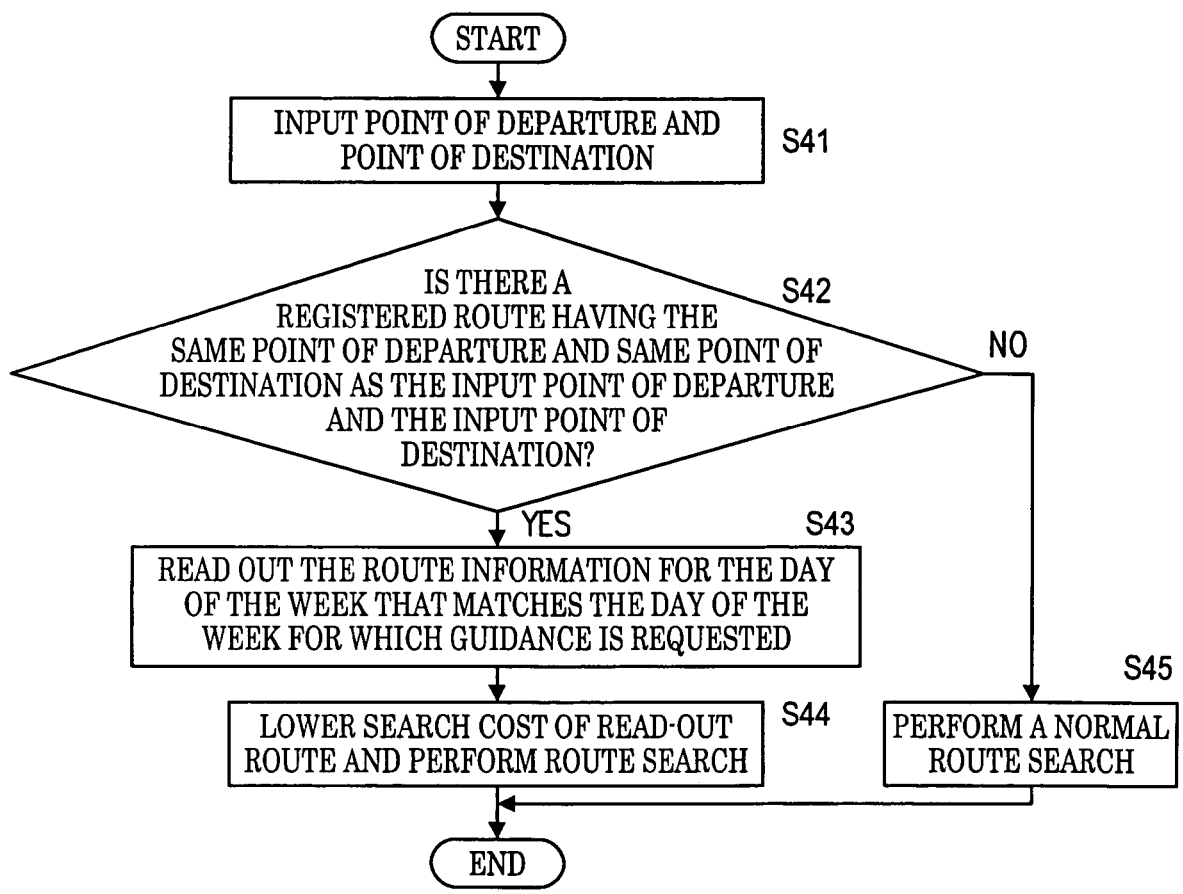
FIG. 13 shows a diagram for explaining a search processing flow of a registration route.

FIG. 13 is a diagram for explaining another embodiment of a search processing flow of the registered route. As shown in FIG. 13, a point of departure and a point of destination are input (step S41). Then, it is determined whether or not there is a registered route having the same point of departure and destination as the input points of departure and destination (step S42). If there is such a registered route, the registered route information for the day of the week corresponding to the day of the week for which guidance is requested is read out (step S43). The search cost of the read-out route is lowered and route search is thus performed (step S44). If there is no registered route at step S42, a normal route search is performed (step S45).

Figure 14:
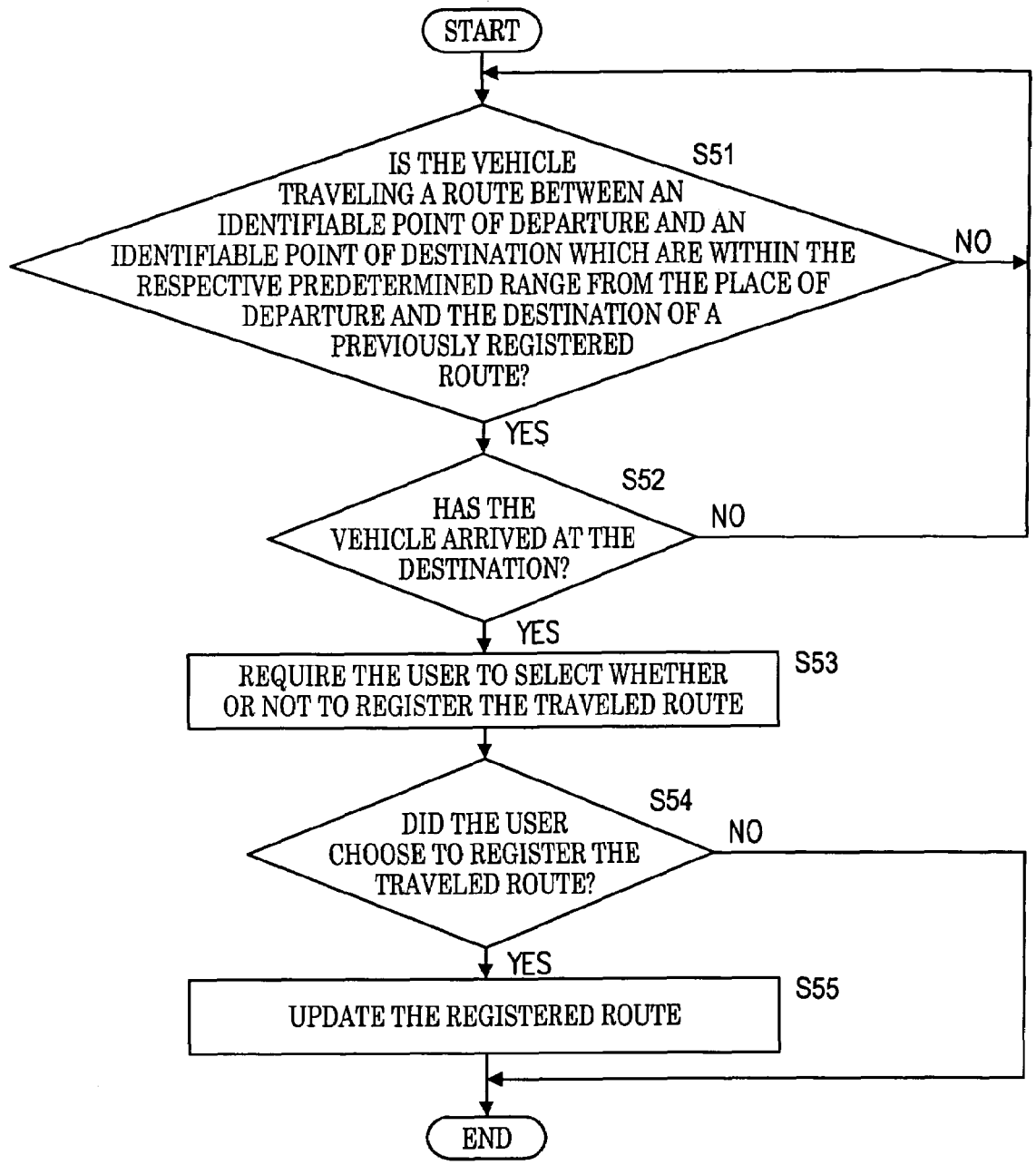
FIG. 14 shows a diagram for explaining an update processing flow of a registration route.

FIG. 14 is a diagram for explaining an update processing flow of the registered route. As shown in FIG. 14, when the vehicle travels a route between an identifiable point of departure and an identifiable point of destination which are within the respective predetermined range from the place of departure and the destination of a previously registered route (step S51) and arrives at the destination (step S52), the user is required to select whether or not to register the traveled route (step S53). If the user selects to register (Step S54), the registered route is updated (step S55), i.e., the selected route replaces the previously registered route having the same departure point and the same destination point.

It should be appreciated that various other embodiments of the systems and methods according to this invention associate and register the place of departure, the destination and the route that the vehicle traveled with both time of day information and day of the week information. Therefore, when the same place of departure and destination are input, registered route information of the day of the week corresponding to the day of the week for which guidance is requested and of the nearest time of day to that for which guidance is requested is read out and can be utilized for the route search.

What is claimed is:

1. A navigation apparatus for a vehicle comprising:
   a registration means for registering a place of departure, a destination, a route traveled by the vehicle, and a time of day that the route was traveled;
   a determination means for determining whether an input place of departure is substantially the same as a place of departure of a registered route and an input destination is substantially the same as a destination of the registered route;
   a route search means for reading out a particular registered route from registered route information when the determination means determines that the input place of departure is substantially the same as the place of departure of the registered route and the input destination is substantially the same as the destination of the registered route, the particular registered route having substantially the same place of departure and destination as the respective input place of departure and input destination and having a registered time of day that is nearest to a time of day for which route guidance between the input place of departure and input destination is requested; and
   a control means for performing route guidance based on a route returned by the search means.

2. The navigation apparatus of claim 1, wherein the route search means:
   reduces a search cost for the read out registered route;
   searches for a route between the input place of departure and input destination with a smallest search cost; and
   returns the route with the smallest search cost.

3. The navigation apparatus of claim 1, wherein the route search means returns the read out route without performing a search.

4. The navigation apparatus of claim 3, wherein when it is determined that it is impossible to travel a portion of the read out route, the route search means only searches for a route around the impossible portion of the read out route.

5. The navigation apparatus of claim 1, wherein both of the input destination and input place of departure are defined by a user.

6. The navigation apparatus of claim 1, further comprising a present position detector, wherein the input destination is defined by a user and the input place of departure is automatically defined as a current position of the vehicle as determined by the present position detector of the navigation apparatus.

7. The navigation apparatus of claim 1, wherein the registration means is usable to record the duration of a route traveled.

8. The navigation apparatus of claim 1, wherein the registration means is usable to update the registered time of day that a route traveled for a registered route.

9. The navigation apparatus of claim 8, wherein the registration means updates the time of day that a route was traveled for a registered route when a traveled route has substantially the same place of departure and destination as a respective place of departure and destination of a registered route and the time of day that the traveled route was traveled is within a predetermined time of the registered time of day that a route was traveled for the registered route.

10. The navigation apparatus of claim 9, wherein the registration means only updates the time of day that a route was traveled for a registered route when an user input is received requesting that the time of day that a route was traveled for the registered route is received.

11. A navigation apparatus for a vehicle comprising:
a registration means for registering a place of departure, a destination, a route traveled by the vehicle, and a day of the week that the route was traveled;
a determination means for determining whether an input place of departure is substantially the same as a place of departure of a registered route and an input destination is substantially the same as a destination of the registered route;
a route search means for reading out a particular registered route from registered route information when the determination means determines that the input place of departure is substantially the same as the place of departure of the registered route and the input destination is substantially the same as the destination of the registered route, the particular registered route having substantially the same place of departure and destination as the respective input place of departure and input destination and having a registered day of the week that is the same as a day of the week for which route guidance between the input place of departure and input destination is requested; and
a control means for performing route guidance based on a route returned by the search means.

12. The navigation apparatus of claim 11, wherein the route search means:
reduces a search cost for the read out registered route;
searches for a route between the input place of departure and input destination with a smallest search cost; and
returns the route with the smallest search cost.

13. The navigation apparatus of claim 11, wherein the route search means returns the read out route without performing a search.

14. The navigation apparatus of claim 13, wherein when it is determined that it is impossible to travel a portion of the read out route, the route search means only searches for a route around the impossible portion of the read out route.

15. The navigation apparatus of claim 11, wherein both of the input destination and input place of departure are defined by a user.

16. The navigation apparatus of claim 11, further comprising a present position detector, wherein the input destination is defined by a user and the input place of departure is automatically defined as a current position of the vehicle as determined by the present position detector of the navigation apparatus.

17. The navigation apparatus of claim 11, wherein the registration means is usable to record the duration of a route traveled.

18. A navigation apparatus for a vehicle comprising:
a registration means for registering a place of departure, a destination, a route traveled by the vehicle, a time of day that the route was traveled, and a day of the week that the route was traveled;
a determination means for determining whether an input place of departure is substantially the same as a place of departure of a registered route and an input destination of is substantially the same as a destination of the registered route;
a route search means for reading out a particular registered route from registered route information when the determination means determines that the input place of departure is substantially the same as the place of departure of the registered route and the input destination is substantially the same as the destination of the registered route, the particular registered route having substantially the same place of departure and destination as the respective input place of departure and input destination, a registered day of the week that is the same as a day of the week for which route guidance between the input place of departure and input destination is requested, and a registered time of day that is nearest to a time of day for which route guidance between the input place of departure and input destination is requested; and
a control means for performing route guidance based on a route returned by the search means.

19. A method for providing guidance based on a registered route comprising:
inputting a place of departure;
inputting a destination;
comparing the input place of departure and input destination to respective places of departure and destinations of registered routes;
determining if the input place of departure is substantially the same as a place of departure of a registered route and an input destination is substantially the same as a destination of a registered route;
reading out a particular registered route when it is determined that the input place of departure is substantially the same as the place of departure of the registered route and the input destination is substantially the same as the destination of the registered route, the particular registered route having a time of day that is nearest to a time of day for which the guidance is requested; and
providing guidance.

20. The method of claim 19, further comprising:
lowering a search cost for the read out registered route; and
searching for a route between the input place of departure and input destination with a lowest search cost;
wherein providing guidance comprises providing guidance based on the route between the input place of departure and input destination with a lowest search cost.

21. The method of claim 19, wherein providing guidance comprises providing guidance based on the read out registered route.

22. The method of claim 21, further comprising:
searching, if it is determined that it is impossible to travel a portion of the read out registered route, for a route around the impossible portion of the read out route.

23. A method for providing guidance based on a registered route comprising:
inputting a place of departure;
inputting a destination;
comparing the input place of departure and input destination to respective places of departure and destinations of registered routes;
determining if the input place of departure is substantially the same as a place of departure of a registered route and an input destination is substantially the same as a destination of a registered route;
reading out a particular registered route when it is determined that the input place of departure is substantially the same as the place of departure of the registered route and the input destination is substantially the same as the destination of the registered route, the particular registered route having a day of the week that is the same as a day of the week for which the guidance is requested; and
providing guidance.

24. The method of claim 23, further comprising:
lowering a search cost for the read out registered route; and
searching for a route between the input place of departure and input destination with a lowest search cost;
wherein providing guidance comprises providing guidance based on the route between the input place of departure and input destination with a lowest search cost.

25. The method of claim 23, wherein providing guidance comprises providing guidance based on the read out registered route.

26. The method of claim 25, further comprising:
searching, if it is determined that it is impossible to travel a portion of the read out registered route, for a route around the impossible portion of the read out route.

27. A method for providing guidance based on a registered route comprising:
inputting a place of departure;
inputting a destination;
comparing the input place of departure and input destination to respective places of departure and destinations of registered routes;
determining if the input place of departure is substantially the same as a place of departure of a registered route and an input destination is substantially the same as a destination of a registered route;
reading out a particular registered route when it is determined that the input place of departure is substantially the same as the place of departure of the registered route and the input destination is substantially the same as the destination of the registered route, the particular registered route having a day of the week that is the same as a day of the week for which the guidance is requested and having a time of day that is nearest to a time of day for which the guidance is requested; and
providing guidance.

* * * * *